Sept. 9, 1924.
W. SCHONS
1,507,896
VENTILATING ATTACHMENT AND HEATER RECEPTACLE FOR AUTOMOBILES
Filed May 13, 1920
2 Sheets-Sheet 1
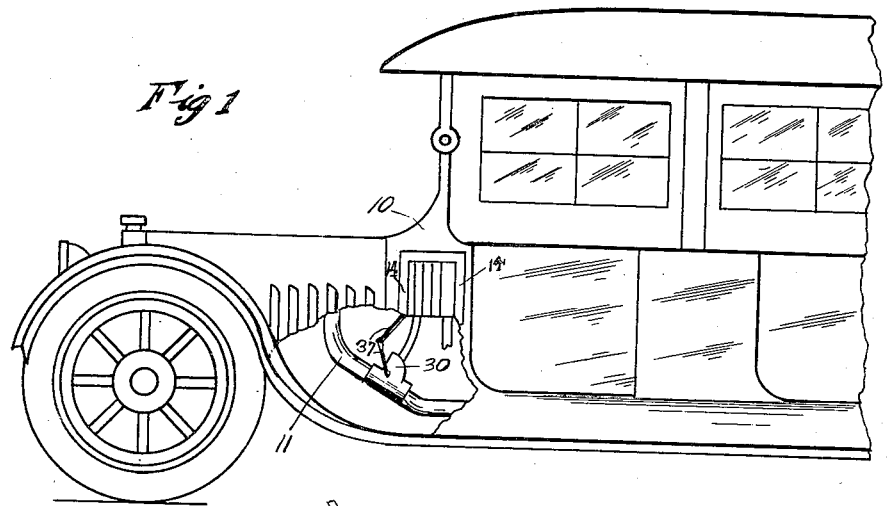
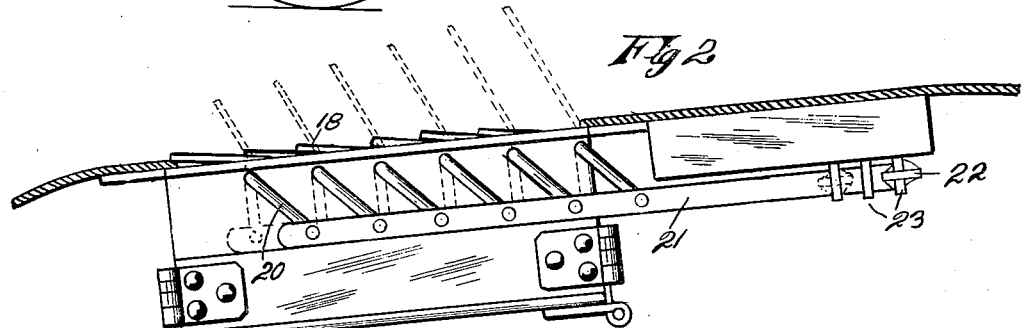
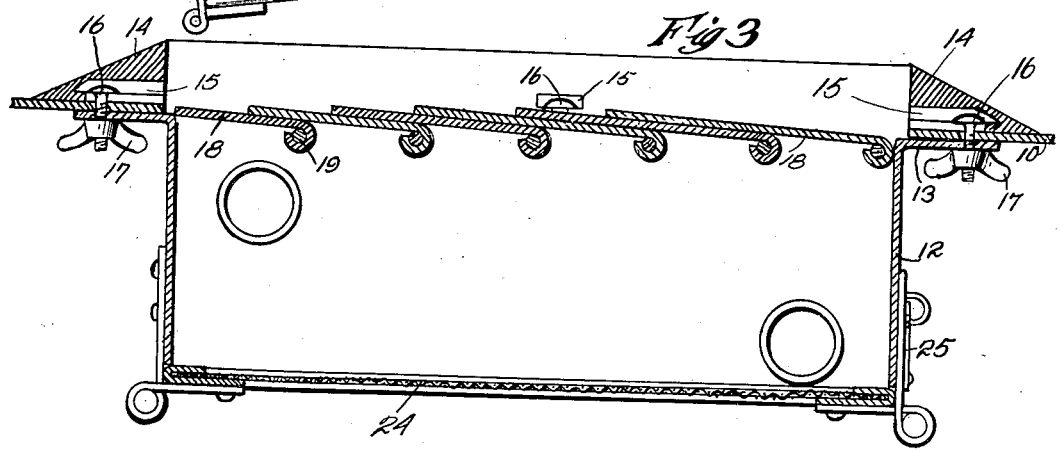
Witness
Nevin Frissel
Inventor
Will Schons
By Orwig + Bair.
Attorneys

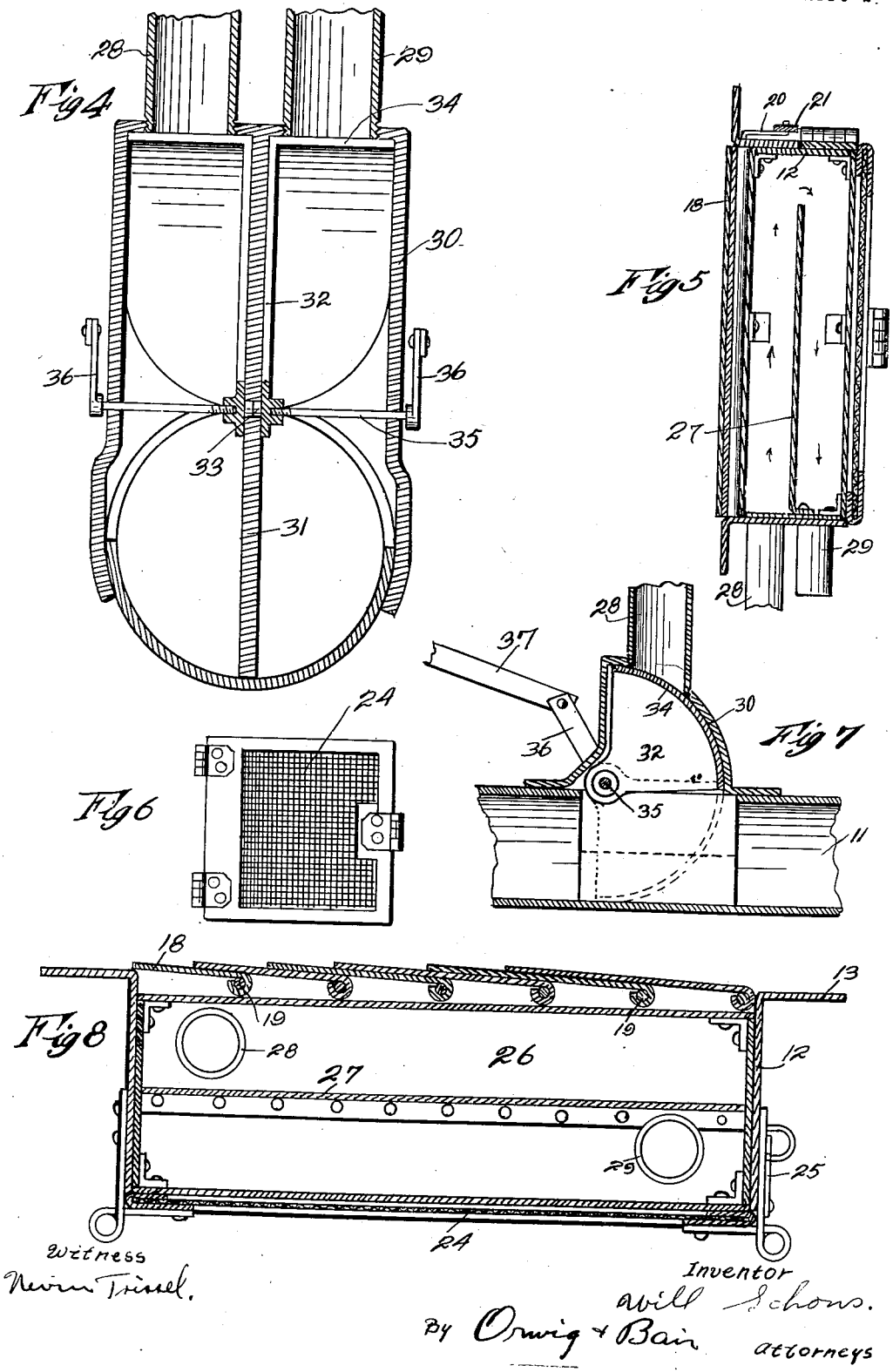

Patented Sept. 9, 1924.

1,507,896

UNITED STATES PATENT OFFICE.

WILL SCHONS, OF DES MOINES, IOWA.

VENTILATING ATTACHMENT AND HEATER RECEPTACLE FOR AUTOMOBILES.

Application filed May 13, 1920. Serial No. 381,213.

*To all whom it may concern:*

Be it known that I, WILL SCHONS, a citizen of the United States, and resident of Des Moines, in the county of Polk and State of Iowa, have invented a certain new and useful Ventilating Attachment and Heater Receptacle for Automobiles, of which the following is a specification.

The object of my invention is to provide a heating and ventilating device capable of being quickly and easily applied to an automobile body of any of the ordinary sizes and styles, or, if desired, it may be attached to automobiles when being constructed, and whereby in warm weather the operator may conveniently and easily, from the driver's seat, provide any desired amount of ventilation by directing currents of air into the front of the car, and also may vary the amount of said ventilation or air currents in proportion to the requirements, or the ventilators may be tightly closed when desired.

A further object is to provide a device of this kind into which in cold weather the operator may readily, quickly and easily insert in the ventilator body a heating member receiving its heat from the exhaust manifold of the engine, whereby this heat will be radiated into the interior of the car through the ventilator frame.

Still a further object is to provide a device of this kind of simple, durable and inexpensive construction, and that may be readily and easily manipulated by unskilled operators without the use of tools.

My invention consists in the construction, arrangement and combination of the various parts of the device, whereby the objects contemplated are attained, as hereinafter more fully set forth, pointed out in my claim, and illustrated in the accompanying drawings, in which:

Figure 1 shows a side elevation of a part of an automobile having my improved heater receptacle and ventilating device applied thereto, a part of the automobile body being broken away to show the attachment of my heater device to the exhaust manifold.

Figure 2 shows a top or plan view of my improved heater receptacle and ventilator as applied to a side of a car body. The dotted lines in this figure show the position of the ventilator shutters when extended for providing a maximum of ventilation or air currents in the interior of the car.

Figure 3 shows a horizontal, sectional view through my improved ventilator, illustrating particularly the means for attaching same to an automobile body, and also showing the intake and exhaust pipes for a heater to be inserted in the ventilator.

Figure 4 shows an enlarged, detail, sectional view of part of the engine exhaust pipe, with my improved heat collecting and distributing device applied thereto.

Figure 5 shows a horizontal sectional view taken through my improved ventilating device, with the heater in position. The arrows in this figure indicate the direction of the heat circulation.

Figure 6 shows an inside face view of my improved ventilator, to illustrate the hinged arrangement of the screen.

Figure 7 shows a detail sectional view of the heat collecting and distributing device, applied to the exhaust manifold. The dotted lines in said figure show the heat deflector in position for directing the heat from the exhaust manifold to the heating device; and Figure 8 shows a horizontal sectional view of the ventilator substantially like Figure 3, with the heater inserted in position for use.

Referring to the accompanying drawings, I have used the reference numeral 10 to indicate generally the automobile body. 11 indicates the engine exhaust manifold.

My improved ventilating device comprises a rectangular sheet metal frame, open both at its outer and its inner faces, and indicated by the numeral 12. At its outer face are the outwardly extending flanges 13, which are designed to lie against the inner surface of the automobile body, preferably at the side thereof, slightly in the rear of the hood.

For attaching this frame to an automobile body, I preferably provide a rectangular frame 14 of a size to fit over the outer surface of the automobile body, surrounding the opening that is made for the heater and ventilator. This frame is preferably provided with slots 15 which extend from its inner surface outwardly a short distance and are designed for the reception of the bolts 16. The bolts are first placed in position in the slots, then the frame 14 is placed on the outer surface of the body, with the bolts projecting through openings in the body, and then the flanges 13 are placed against the interior of the body with the bolts 16 passed through them, and then the wing nuts 17 are applied to the bolts, thus firmly clamping together the frame 14 and the flanges 13 to the body 10, and thereby firmly and securely, and yet detachably, supporting the ventilating body in position.

In the outer face of the ventilating body are the ventilating shutters. These are made of sheet metal and are indicated by the numeral 18, and each is fixed to a rotatable shaft 19 extended vertically and having its bearings in the sides of the body 12. Each also has a crank arm 20 on its upper end, as shown in Figure 2. These shutters are characterized by having the outer ones comparatively narrow from the front to the rear edges thereof, and the rear ones increasingly wider from the front to the the rear edges thereof, as plainly illustrated in Figure 3, and this construction provides the following advantageous result:

Referring to the dotted lines in Figure 2, it will be seen that by reason of this construction of the shutters, and when the automobile containing the device is moved forwardly rapidly, each shutter will project outwardly from the side of the automobile slightly farther than the one in front of it, so that each shutter will deflect into the automobile body a proportionate share of air currents. These shutters are also so arranged that when closed, as shown in Figure 3, they will overlap and thus completely seal up the ventilating device and prevent the entrance of air currents.

For conveniently and easily manipulating these shutters, I have connected all of the cranks 20 to a rod 21, and this rod is provided with a loop 22 designed to be placed on any one of the pins 23. In the present instance three pins are shown, and the shutters may be held by such pins either in the closed position shown by solid lines in Figure 2, wide open as shown by dotted lines in said figure, or in an intermediate position.

On the interior of the ventilating body is a hinged screen 24, capable of swinging inwardly and being secured in position by an ordinary latch device 25, and this is so arranged that when the screen is swung open it will completely uncover the inner face of the ventilating body.

A heater may be employed in connection with my device which consists of an attachment which may be wholly removed during warm weather, and readily, quickly and easily applied in cold weather. It comprises essentially a closed, rectangular, sheet metal heating body 26, having a partition 27 therein extending from one side to a point spaced apart from the other, as clearly shown in Figure 5. This heating box is of a size to be readily and easily inserted in the ventilating body 12, through the inner face thereof, when the screen is open, and it is supported and held in position only by the latch 25 for the screen; that is to say, it is simply slipped into position, and the screen closed and latched, and no other supporting or fastening means is necessary.

Inserted in the bottom of the heating and ventilating box are the heat tubes 28 and 29, the tube 28 being in communication with the casing 30 to be applied to the exhaust pipe 11 as hereinafter described, and the tube 29 being extended a short distance from the heating and ventilating box to a suitable point of discharge or as shown in Figure 4, into the casing 30.

The device for conveying heat from the exhaust manifold to the heat pipe 28 comprises a casing 30 having its sides arranged to overlap the manifold 11, and being held thereon by friction, or suitable clamps may be applied if desired. This casing has a central partition 31, dividing the casing vertically and extending down to the interior of the exhaust manifold, as shown in Figure 4. At the top of the casing 30 are the heat pipes 28 and 29, and on the interior of each compartment is a heat deflector. This deflector comprises a segmental plate 32, pivoted at 33 to the partition 31 and having a curved deflector plate 34. Each deflector plate is also provided with a shaft 35 having a crank arm 36, which crank arm is connected to a link 37 by which the deflector plate may be adjusted and held in such adjusted position by the operator. This link 37 preferably extends to a point conveniently accessible for the driver. When the deflector plate 34 is in the position shown in Figure 7, then the heat will flow through the exhaust pipe in the normal manner, and will be prevented from passing through the heat pipe 28. When, however, the deflector is moved to the dotted line position shown in Figure 7, then a large portion of the exhaust heat will be deflected thereby upwardly through the heat pipe 28 and through the heater, and will find its point of discharge through the pipe 29.

In connection with the heater device, it will be understood that I have thus far described simply one side of the device, and it is to be understood that there is an independent heater in each side of the automobile body, and that by suitable adjustment of the links 37 the desired amount of heat may be directed into and through either of the heaters independently of the other.

In practical use, it is obvious that my attachment may be applied very readily and easily to any of the ordinary automobile bodies, by simply cutting an opening in the body, of suitable size to receive the device, and the operator does not need to exercise great care in the cutting of this opening, for the margins of it will be covered and concealed and strengthened by my attachment.

The attachment is applied, as before described, by simply placing the rigid frame on the exterior of the body, and the ventilator body on the interior, and then tightening up the bolts, thus permanently securing the parts in position and strengthening and reinforcing the body around the opening.

During warm weather the heating device is wholly omitted and the device operates as a ventilator, and is particularly efficient as such ventilator because it may be wholly closed and made dust-proof by simply closing the shutters; or the shutters may be opened to any desired extent, and when fully opened may well collect very strong air currents and draw them into the interior of the car at the front. The screen in this instance prevents the entrance of dust and insects.

Then during cold weather the ventilator body is useful because it provides a receptacle well adapted to receive a heater, so that the ventilator performs two functions: first, its ordinary function as a ventilator; and, second, its very important function as a convenient and suitable frame and receptacle for the heater.

The heating elements, as before mentioned, may be applied at any time by simply opening the screens on the inner sides of the ventilators and placing the heating boxes therein. No other change or attachment is necessary, and this can be done, as before mentioned, without tools.

I claim as my invention:

A device of the class described, comprising a ventilator frame open both at its outer and its inner surfaces, and designed to be detachably secured to the body of an automobile, the frame being inserted through an opening made for that puropse in the automobile body, a series of shutters at the outer side of the frame, each pivotally connected and capable of swinging from positions overlapping each other to close the opening at the outer side of the frame to positions extending outwardly, said shutters being made progressively longer from the front toward the rear so that when opened the rear shutter will project outwardly from the rear side of the frame to a greater extent than will the front shutter, means for opening and closing the shutters, and a screen at the inner face of the ventilating frame shaped and constructed that when in an open position a heater may be inserted in the frame, and when closed it will support the heater against movement inwardly, said shutters being so shaped and designed as to support the heater against movement outwardly.

Des Moines, Iowa, May 1, 1920.

WILL SCHONS.